(12) United States Patent
Kawaguchi et al.

(10) Patent No.: US 6,719,537 B2
(45) Date of Patent: Apr. 13, 2004

(54) COMPRESSOR AND PULLEY FOR COMPRESSOR

(75) Inventors: Masahiro Kawaguchi, Kariya (JP); Masaki Ota, Kariya (JP); Taku Adaniya, Kariya (JP); Akinobu Kanai, Kariya (JP); Takahiro Suzuki, Kariya (JP); Takeshi Kawata, Kariya (JP); Akira Nakamoto, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/091,830

(22) Filed: Mar. 6, 2002

(65) Prior Publication Data

US 2002/0146326 A1 Oct. 10, 2002

(30) Foreign Application Priority Data

Mar. 14, 2001 (JP) .......................... 2001-072903
Aug. 6, 2001 (JP) .......................... 2001-238378
Aug. 6, 2001 (JP) .......................... 2001-238379

(51) Int. Cl.[7] .............................. F04B 49/00; F04B 1/12
(52) U.S. Cl. ........................................ 417/223; 417/269
(58) Field of Search ............................... 417/223, 269, 417/222.2; 474/166, 161, 174

(56) References Cited

U.S. PATENT DOCUMENTS

| | | | | |
|---|---|---|---|---|
| 4,178,135 A | * | 12/1979 | Roberts | 417/222.2 |
| 5,393,266 A | * | 2/1995 | Braun et al. | 464/67 |
| 5,611,416 A | * | 3/1997 | Berger et al. | 192/58.42 |
| 5,975,860 A | | 11/1999 | Obayashi et al. | 417/223 |
| 6,026,709 A | * | 2/2000 | Depp et al. | 474/166 |
| 6,048,284 A | * | 4/2000 | Gerhardt et al. | 474/178 |

FOREIGN PATENT DOCUMENTS

| | | |
|---|---|---|
| JP | 60-3339 | 1/1985 |
| JP | 09-317628 | 12/1997 |
| JP | 2000-213600 | 8/2000 |
| JP | 2000-274489 | 10/2000 |

* cited by examiner

Primary Examiner—Justine R. Yu
Assistant Examiner—Michael K. Gray
(74) Attorney, Agent, or Firm—Morgan & Finnegan, LLP

(57) ABSTRACT

A compressor has a pulley for transmitting torque from an external drive source to a rotary shaft to drive a compression mechanism. The pulley has a pulley body. The compressor has a mass body located in a range that is radially inward of the outer circumference of the pulley. The mass body swings about an axis that is spaced from the rotation axis of the pulley body by a predetermined distance and is substantially parallel to the rotation axis of the pulley body.

21 Claims, 7 Drawing Sheets

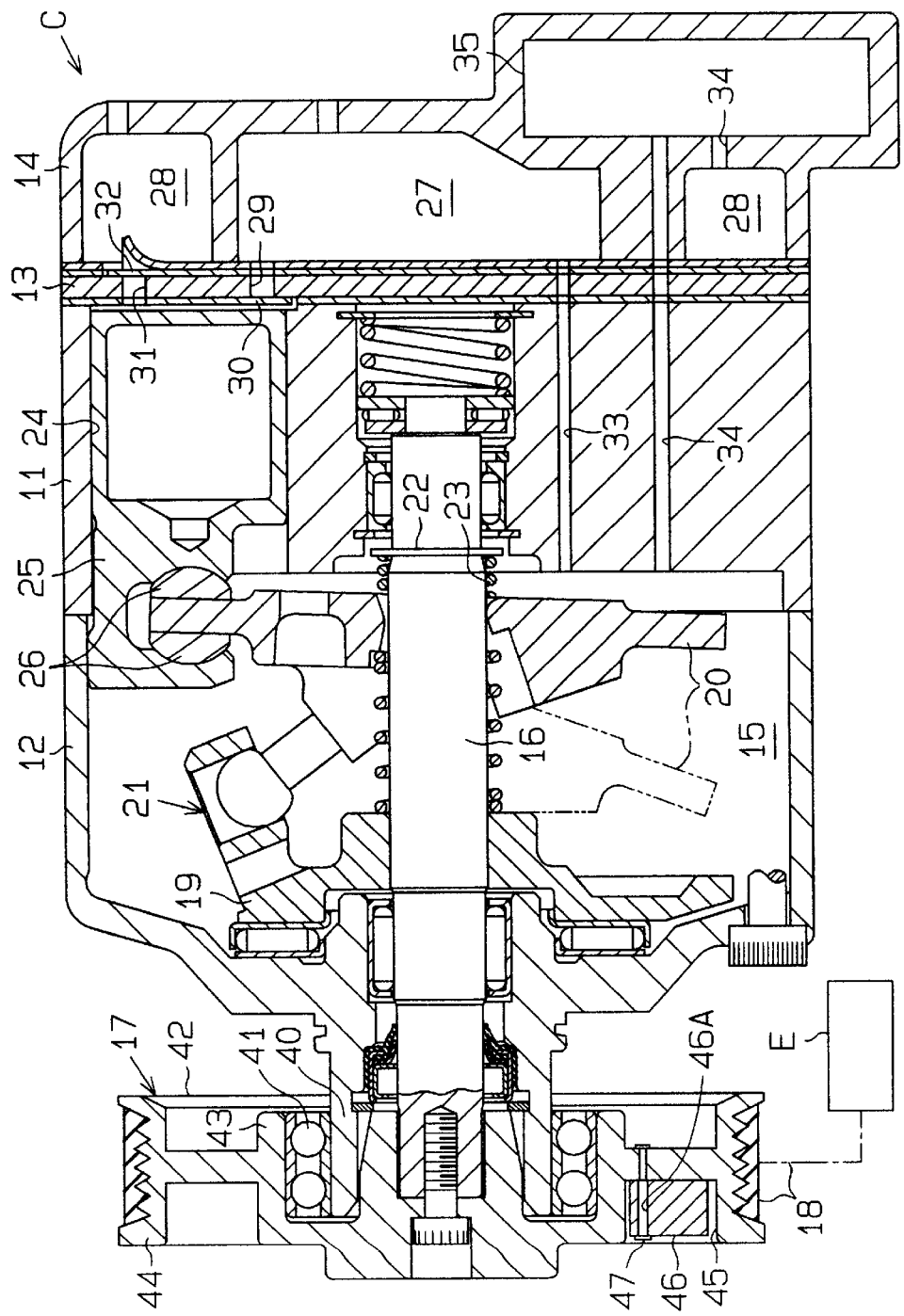

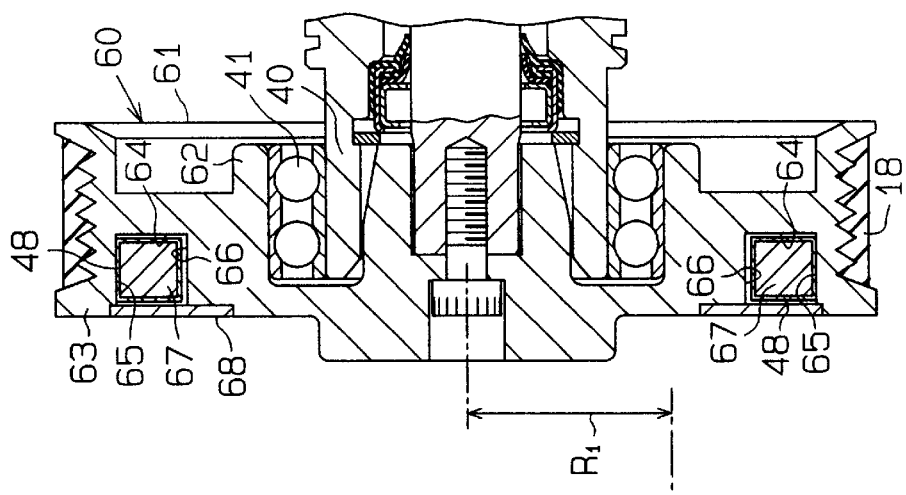
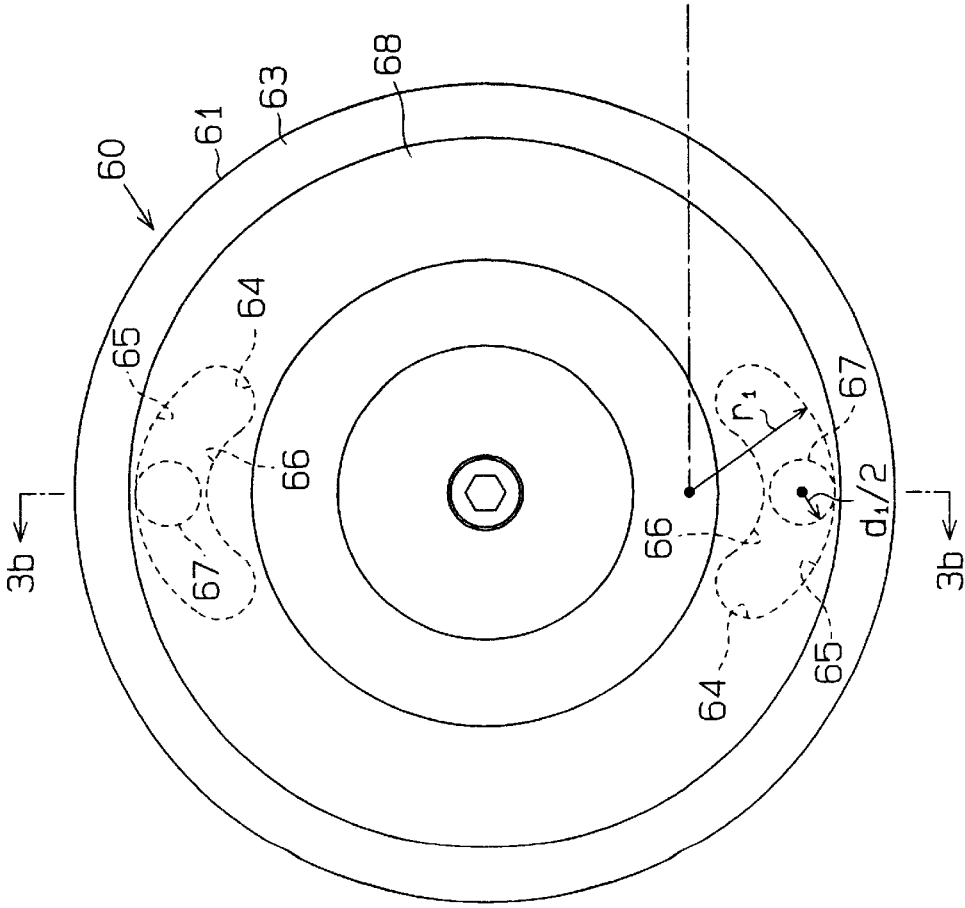

COMPRESSOR AND PULLEY FOR COMPRESSOR

BACKGROUND OF THE INVENTION

The present invention relates to a pulley for transmitting torque from an external drive source to a rotary shaft thereby driving a compression mechanism. The present invention also pertains to a compressor having such a pulley.

Typically, a damper mechanism is employed for reducing torque fluctuations in a rotary shaft of a rotation apparatus, thereby preventing resonance. Such a damper mechanism is coupled, for example, to the output shaft of a drive source such as an engine or to the input shaft of a driven rotational apparatus such as a compressor. When used in a compressor, a damper mechanism is generally coupled to a rotary shaft of the compressor, which is coupled to an engine through rotors such as a hub and a pulley. Also, a certain type of damper mechanism is located in a hub or a pulley.

For example, Japanese Laid-Open Patent Publication No. 9-317628 discloses a dynamic damper used in a compressor. The dynamic damper includes an elastic member and a mass body. The elastic member is attached to one end of the rotary shaft of the compressor. The mass body is coupled to the rotary shaft through the elastic member. When the rotary shaft is torsionally vibrated due to compression of gas by the pistons, the mass body is resonated to consume the kinetic energy, which suppresses the peaks of torque fluctuations caused by the torsional vibration. Accordingly, resonance generated between the compressor and other devices (external rotational apparatus) is reduced.

Pendulum type damper mechanisms, which are typically used for engines, are also known in the art. A pendulum type damper mechanism includes a rotor, which is fixed to the crankshaft of the engine. A pendulum is attached to the rotor. Swinging of the pendulum suppresses the peaks of torque fluctuations due to torsional vibrations of the crankshaft. The pendulum swings about an axis that is spaced from the rotation axis of the rotor by a predetermined distance and is parallel to the rotation axis of the rotor.

In the former structure, the mass body, which is accommodated in the housing, is relatively large and heavy. This increases the weight and the size of the compressor. Also, the mass body is attached to the rotary shaft through the elastic member, which is influenced by temperature changes. Therefore, it is difficult to match the characteristic frequency of the dynamic damper with the frequency of the peaks of the torsional vibrations of the rotary shaft (the frequency of the peaks of the torque fluctuations).

In the latter structure, the pendulum is connected to the crankshaft through the rotor, which increases the weight and the size of the rotor.

In the dynamic damper disclosed in Japanese Laid-Open Patent Publication No. 2000-274489, each of roller mass bodies reciprocates along a cylindrical path.

The mass body is accommodated in a guiding portion (accommodation chamber) formed in the rotor. Part of the inner surface of the guide portion is formed as a part of the inner surface of a cylinder. The center of curvature of the cylinder is an axis that is spaced from the rotation axis of the rotor by a predetermined distance and is parallel to the rotation axis of the rotor. When the rotor rotates, centrifugal force presses the mass body against the cylinder inner surface. In this state, torque fluctuations of the rotary shaft are received by the rotor and swing the mass body along the cylinder inner surface.

Sliding movement of the mass body on the cylinder inner surface wears the mass body and the cylinder inner surface, or the rotor. This will change the shape of the mass and the shape of the cylindrical inner surface. As a result, the settings for effectively preventing resonance are changed, which degrades the resonance prevention performance. Further, the wear shortens the life of the rotor, or the rotation apparatus.

SUMMARY OF THE INVENTION

Accordingly, it is an objective of the present invention to provide a compressor having a compact and light pulley that is easily adjusted to reduce resonance. Another objective of the present invention is to provide a compressor that prevents its resonance reduction performance from deteriorating and its life from being shortened.

To achieve the foregoing and other objectives and in accordance with the purpose of the present invention, a compressor is provided. The compressor has a pulley for transmitting torque from an external drive source to a rotary shaft to drive a compression mechanism. The pulley has a pulley body. The compressor comprises a mass body located in a range that is radially inward of the outer circumference of the pulley. The mass body swings about an axis that is spaced from the rotation axis of the pulley body by a predetermined distance and is substantially parallel to the rotation axis of the pulley body.

The present invention also provides a pulley for a compressor. The pulley comprises a pulley body and a mass body. The mass body is located in a range that is radially inward of the outer circumference of the pulley. The mass body swings about an axis that is spaced from the rotation axis of the pulley body by a predetermined distance and is substantially parallel to the rotation axis of the pulley body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a cross-sectional view illustrating a compressor according to a first embodiment of the present invention;

FIG. 3(a) is a front view illustrating a pulley according to a second embodiment of the present invention;

FIG. 3(b) is a cross-sectional view taken along line 3b—3b of FIG. 3(a);

DETAILED DESCRIPTION OF THE PREFERRED EMBODIMENTS

Figure 2A:
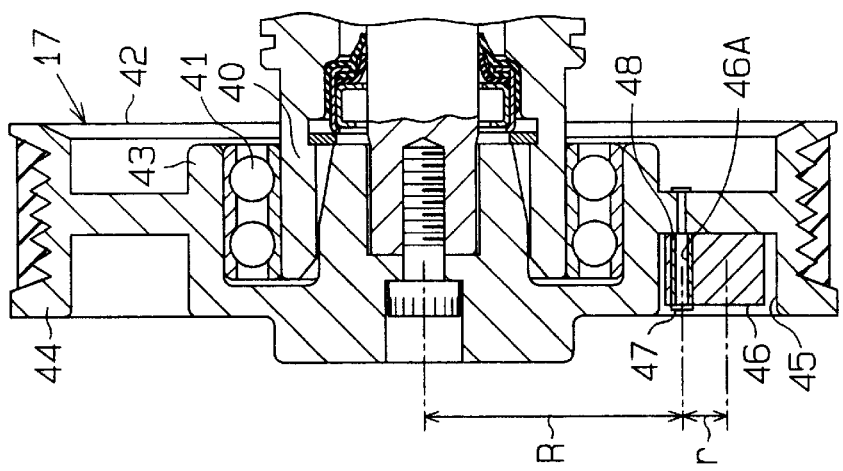
FIG. 2(a) is a front view illustrating a pulley body attached to the compressor of FIG. 1.

A compressor C according to a first embodiment of the present invention will now be described with reference to FIGS. 1 to 2(b). In FIG. 1, the left end of the compressor C is defined as the front end, and the right end of the compressor C is defined as the rear end.

As shown in FIG. 1, the compressor C includes a cylinder block 11, front housing member 12 and a rear housing member 14. The front housing member 12 is secured to the front end face of the cylinder block 11. The rear housing member 14 is secured to the rear end face of the cylinder block 11, and a valve plate assembly 13 is located between the rear housing member 14 and the rear end face. The cylinder block 11, the front housing member 12, the valve plate assembly 13, and the rear housing member 14 form the housing of the compressor C.

The cylinder block 11 and the front housing member 12 define a crank chamber 15. A rotary shaft, which is a drive shaft 16 in this embodiment, extends through the crank chamber 15. The drive shaft 16 is rotatably supported.

The front housing member 12 has a cylindrical wall 40, which extends forward. The front end of the drive shaft 16 is located in the cylindrical wall 40, and is connected to an external drive source, which is an engine E in this embodiment, through a pulley 17 and a belt 18 engaged with the pulley 17.

A lug plate 19 is fixed to the drive shaft 16 and is located in the crank chamber 15. A swash plate 20 is also accommodated in the crank chamber 15. The swash plate 20 slides along and inclines relative to the axis of the drive shaft 16. A hinge mechanism 21 is located between the lug plate 19 and the swash plate 20. The hinge mechanism 21 and the lug plate 19 cause the swash plate 20 to rotate integrally with the drive shaft 16.

The minimum inclination angle of the swash plate 20 is defined by a snap ring 22, which is fixed to the drive shaft 16, and a spring 23, which extends between the snap ring 22 and the swash plate 20. The minimum inclination angle of the swash plate 20 is an angle of the swash plate 20 when the angle defined by the swash plate 20 and the axis of the drive shaft 16 is the closest to the ninety degrees.

Cylinder bores 24 (only one is shown in FIG. 1) are formed in the cylinder block 11 at constant angular intervals about the axis of the drive shaft 16. Each cylinder bore 24 accommodates a single headed piston 25 such that the piston 25 can reciprocate in the cylinder bore 24. The opening of each cylinder bore 24 is covered by the valve plate assembly 13 and the corresponding piston 25. A compression chamber is defined in each cylinder bore 24. The volume of each compression chamber varies in accordance with the reciprocation of the corresponding piston 25. The front end of each piston 25 is coupled to the periphery of the swash plate 20 through a pair of shoes 26. The swash plate 20 is rotated as the drive shaft 16 rotates. Rotation of the swash plate 20 is converted into reciprocation of each piston 25 by the corresponding pair of shoes 26.

The drive shaft 16, the lug plate 19, the swash plate 20, the hinge mechanism 21, the pistons 25, and the shoes 26 form a piston type compression mechanism.

A suction chamber 27 and a discharge chamber 28 are defined between the valve plate assembly 13 and the rear housing member 11. The discharge chamber 28 is located around the suction chamber 27. Suction ports 29 and discharge ports 31 are formed in the valve plate assembly 13. Each suction port 29 and each discharge port 31 correspond to one of the cylinder bores 24. Suction valve flaps 30 and discharge valve flaps 32 are also formed in the valve plate assembly 13. Each suction valve flap 30 corresponds to one of the suction ports 29. Each discharge valve flap 32 corresponds to one of the discharge ports 31. Each cylinder bore 24 is connected to the suction chamber 27 through the corresponding suction port 29. Each cylinder bore 24 is also connected to the discharge chamber 28 through the corresponding discharge port 31.

When each piston 25 moves from the top dead center position to the bottom dead center position, refrigerant gas in the suction chamber 27 is drawn into the corresponding compression chamber through the corresponding suction port 29 while flexing the corresponding suction valve flap 30 to an open position. As the piston 25 is moved from the bottom dead center position to the top dead center position, the refrigerant gas is compressed to a predetermined pressure and is discharged to the discharge chamber 28 through the corresponding discharge port 31 while flexing the corresponding discharge valve flap 32 to an open position.

The suction chamber 27 is connected to the discharge chamber 28 through an external refrigerant circuit (not shown). Refrigerant discharged from the discharge chamber 28 flows to the external refrigerant circuit. In the circuit, heat exchange through refrigerant takes place. Refrigerant discharged from the circuit is drawn into the suction chamber 27, and then drawn into the cylinder bores 24 to be compressed again.

A bleed passage 33 is formed in the compressor housing to connect the crank chamber 15 with the suction chamber 27. A supply passage 34 is also formed in the compressor housing to connect the discharge chamber 28 with the crank chamber 15. The supply passage 34 is regulated by a control valve 35, which is located in the supply passage 34.

The opening of the control valve 35 is adjusted to control the flow rate of highly pressurized gas supplied to the crank chamber 15 through the supply passage 34. The pressure in the crank chamber 15, or crank chamber pressure Pc, is determined by the ratio of the refrigerant gas supplied to the crank chamber 15 through the supply passage 34 and the flow rate of refrigerant gas conducted out from the crank chamber 15 through the bleed passage 33. As the crank chamber pressure Pc varies, the difference between the crank chamber pressure Pc and the pressure in the compression chambers, which changes the inclination angle of the swash plate 20. Accordingly, the stroke of each piston 25, or the compressor displacement, is varied.

Figure 2B:
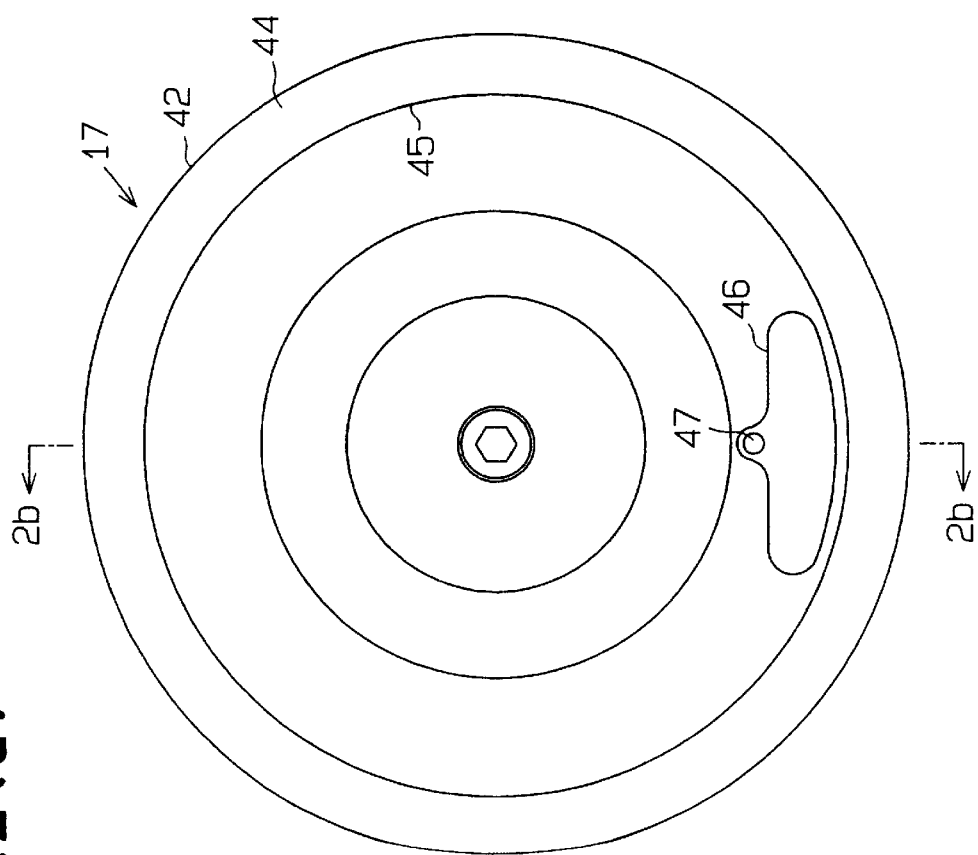
FIG. 2(b) is a cross-sectional view taken along line 2b—2b of FIG. 2(a)

As shown in FIGS. 1 and 2(b), the pulley 17 is supported by the cylindrical wall 40 with a bearing 41. The pulley 17 is coupled to the front end of the drive shaft 16 and rotates integrally with the drive shaft 16.

As shown in FIGS. 1 to 2(b), the pulley 17 has a pulley body 42, a boss 43, which is fitted to the outer ring of the bearing 41, and a belt receiving portion 44, to which the belt 18 is engaged. An annular recess 45 is formed in the pulley body 42 between the boss 43 and the belt receiving portion 44. A mass body, which is a rigid pendulum 46 in this embodiment, is located in the recess 45.

The rigid pendulum 46 is attached to the pulley body 42 by a support shaft 47, which is fixed to the boss 43 of the pulley body 42 and extends through a hole 46A formed in the rigid pendulum 46. The rigid pendulum 46 swings about the support shaft 47. A wear reduction member, which is fluorocarbon resin coating 48 in this embodiment, is formed on the inner surface of the hole 46A to reduce wear of the hole 46A due to contact with the support shaft 47. In FIG. 2(b), the fluorocarbon resin coating 48 is exaggerated for purposes of illustration. The support shaft 47 is spaced from the rotation axis of the pulley body 42 by a predetermined distance. The axis of the support shaft 47 is parallel to the rotation axis of the pulley body 42. The rotation axis of the pulley body 42 is aligned with the axis of the drive shaft 16. A head is formed at the distal end of the support shaft 47. The diameter of the head is greater than that of the hole 46A. The head thus prevents the rigid pendulum 46 from coming off the support shaft 47.

The rigid pendulum 46 functions as a centrifugal pendulum when the pulley body 42 rotates. In this embodiment, the position, the shape, and the mass of the rigid pendulum 46 are determined such that swinging of the rigid pendulum 46 reduces torque fluctuations due to torsional vibrations of the drive shaft 16.

Settings of the rigid pendulum 46 will now be described.

The rigid pendulum 46 reduces torque fluctuation the frequency of which is equal to the characteristic frequency of the pendulum 46. Therefore, determining the characteristics of the pendulum 46 such that the characteristic frequency of the pendulum 46 is equal to the frequency of the peaks of torque fluctuations reduces the torque fluctuations. The peaks of the torque fluctuations refer to components at order frequencies.

The frequency of torque fluctuations and the characteristic frequency of the rigid pendulum 46 are proportionate to the angular velocity $\omega_1$ of the drive shaft 16, which correlates with the rotation speed of the drive shaft 16. The frequency of the greatest peak of torque fluctuations of the compressor C is represented by a product $(\omega_1/2\pi)$ N of the rotation speed of the drive shaft 16 $(\omega_1/2\pi)$ and the number N of the cylinder bores 24. Through experiments, it has been discovered that the frequency of an nth (n is a natural number) greatest peak of the torque fluctuation of the compressor C tends to be equal to the product $n(\omega_1/2\pi)N$.

The characteristic frequency of the rigid pendulum 46 is represented by the product of the rotation speed $(\omega_1/2\pi)$ of the drive shaft 16 and the square root of the ratio R/r. R is the distance between the rotation axis of the pulley body 42 and the axis of the pendulum 46, or the axis of the support shaft 47, and r is the distance between the axis of the pendulum 46 and the center of gravity of the pendulum 46.

Therefore, the frequency of the nth greatest peak of torque fluctuations can be matched with the characteristic frequency of the rigid pendulum 46 by equalizing the ratio R/r with the product nN. Accordingly, the nth greatest peak of the torque fluctuation will be reduced.

In this embodiment, the distances R and r are determined such that the square root of the ratio R/r is equal to the number nN when the n is one. This construction reduces the greatest peak of the torque fluctuations.

To effectively reduce torque fluctuations by swinging of the pendulum 46, the torque T about the rotation axis of the pulley body 42 applied by the pendulum 46 needs to be equal to the amplitude of the torque fluctuations so that the torque T acts against the amplitude. When the frequency of the peak of torque fluctuations is equal to the characteristic frequency of the pendulum 46, the torque T is represented by the following equation.

$$T=m(\omega_a)^2(R+r)R\phi \qquad \text{(Equation 1)}$$

Sign m represents the mass of the pendulum 46, $\omega_a$ is the average angular velocity of the pendulum 46 when swinging within a small angle $\phi$.

In this embodiment, the mass m is maximized so that the values R, r and $\phi$ are minimized. As a result, the torque T is maximized without increasing the size of the pulley body 42.

Various settings are made in the assumption that the pendulum 46 is a mass point at the center of gravity.

The operation of the compressor C will now be described.

When force is supplied to the drive shaft 16 from the engine E through the pulley 17, the drive shaft 16 rotates together with the swash plate 20. As the swash plate 20 rotates, each piston 25 is reciprocated by a stroke that corresponds to the inclination angle of the swash plate 20. As a result, refrigerant is repeatedly drawn into, compressed in and discharged from each cylinder bore 24.

When the opening degree of the control valve 35 is decreased, the flow rate of refrigerant gas that is supplied from the discharge chamber 28 to the crank chamber 15 through the supply passage 34 is decreased accordingly. As a result, the crank chamber pressure Pc is lowered and the inclination angle of the swash plate 20 is increased, which increases the displacement of the compressor C. When the opening degree of the control valve 35 is increased, the flow rate of refrigerant gas that is supplied from the discharge chamber 28 to the crank chamber 15 through the supply passage 34 is increased. As a result, the crank chamber pressure Pc is increased and the inclination angle of the swash plate 20 is decreased, which decreases the displacement of the compressor C.

When rotating, the drive shaft 16 receives compression reaction force of refrigerant and reaction force of the reciprocation of the pistons 25 through the swash plate 20 and the hinge mechanism 21. This creates torsional vibrations in the drive shaft 16. The torsional vibration creates torque fluctuations. The torque fluctuations produce resonance in the compressor C and in external rotation apparatus such as the engine E and other auxiliary devices, which are coupled to the compressor C through the pulley 17 and the belt 18.

Torque fluctuations cause the rigid pendulum 46 in the pulley 17 to start swinging. Accordingly, torque applied about the rotation axis of the pulley body 42 reduces the torque fluctuations. The characteristic frequency of the pendulum 46 is set equal to the frequency of the greatest peak of the torque fluctuation. Therefore, the greatest peak is reduced and the torque fluctuation of the pulley 17 is effectively reduced. As a result, resonance caused by the torque fluctuations is effectively reduced.

This embodiment has the following advantages.

(1) The rigid pendulum 46 in the pulley body 42 swings to reduce torsional vibration. As a result, resonance produced in the pulley body 42, the compressor C, and the rotation apparatus coupled to the pulley body 42 through the belt 18 is reduced.

The structure for reducing resonance is located in the pulley 17. Therefore, there is no need to provide a resonance reduction mechanism on the drive shaft 16, to which the pulley 17 is coupled. This reduces the weight and the size of the compressor C.

For example, compared to a case where a mass body is attached to a rotary shaft connected to a pulley body through an elastic member for reducing resonance, the structure of the above illustrated embodiment is less susceptible to temperature changes. Therefore, the characteristic frequency of the pendulum 46 can be easily matched with the frequency of the peak of the torque fluctuations.

Compared to a case where a mass body is directly attached to a rotary shaft connected to a pulley body and a case where a mass body is attached to a rotary shaft connected to a pulley body through an elastic member, the size and the weight of the mass body are decreased in the above illustrated embodiment. Thus, the structure for reducing resonance is compact and light.

(2) The rigid pendulum 46 moves in a range that is radially inward of the outer circumference of the pulley body 42. In other words, the pendulum 46 does not project beyond the circumference of the pulley body 42. Therefore, the structure for reducing resonance occupies relatively small space.

(3) The pendulum 46 is rotatably supported by the pulley body 42 through the support shaft 47, which extends through the hole 46A. A mass body, such as a pendulum, may be coupled to the pulley body 42 through a flexible member. However, when the centrifugal force due to the rotation of the pulley body 42 is less than the gravity and the mass body is located above the rotation axis of the pulley body 42, the mass body may collide with a part that is located radially inward of the mass body. The collision produces noise. In the above illustrated embodiment, the pendulum 46 is directly supported by the pulley body 42 without any elastic members in between. Therefore, the pendulum 46 produces no noise.

(4) The fluorocarbon resin coating 48 is formed on the inner surface of the hole 46A to reduce friction between the hole 46A and the support shaft 47. The coating 48 reduces friction resistance between the support shaft 47 and the pendulum 46, and therefore reduces the wear at the contact portions. In other words, the support shaft 47 and the pendulum 46 are scarcely deformed by wear. This prevents the resonance reduction performance from deteriorating and extends the life of the pulley 17.

A pulley 60 according to a second embodiment of the present invention will now be described with reference FIGS. 3(a) and 3(b). Mainly, the differences from the pulley 17 illustrated in FIGS. 1 to 2(b) will be discussed below.

As shown in FIG. 3(b), the pulley 60 includes a boss 62 and a belt receiving portion 63. The boss 62 is fitted about the outer ring of the bearing 41. The belt 18 is engaged with the belt receiving portion 63. Two guide portions, which are two recesses 64 in this embodiment, are formed in a pulley body 61 of the pulley 60. The recesses 64 are located between the boss 62 and the belt receiving portion 63. The recesses 64 are symmetric with respect to the rotation axis of the pulley body 61.

A guide surface 65 is formed in each recess 64. Each guide surface 65 has an arcuate cross section and is located at the radially outer portion of the recess 64. Each guide surface 65 is included in an imaginary circle. The center of the imaginary circle is spaced from the rotation axis of the pulley body 61 by a predetermined distance $R_1$ and parallel to the rotation axis of the pulley body 61. The radius of the circle is represented by $r_1$.

Each recess 64 includes an auxiliary guide surface 66, which is formed in the radially inner surface and is spaced from the guide surface 65 by a predetermined distance. The auxiliary guide surface 66 has an arcuate cross section. As shown in FIG. 3(a), the center of each recess 64 is located radially outside than the ends. Each recess 64 has constant width. Each recess 64 is symmetric with respect to a line that includes the rotation axis of the pulley body 61 and the center of the corresponding imaginary circle.

A cylindrical rigid roller 67 is accommodated in each recess 64. The roller 67 has a circular cross section. The mass of each roller 67 is represented by $m_1$. The diameter $d_1$ of each roller 67 is slightly less than the distance between the corresponding guide surface 65 and the corresponding auxiliary guide surface 66. The length of each roller 67 along the axial direction of the pulley 60 is slightly less than the length of the corresponding recess 64 along the same direction. That is, each roller 67 can move along the corresponding guide surface 65 in the corresponding recess 64. An annular lid 68 is fixed to the boss 43 by bolts (not shown) to cover the opening of each recess 64. The lid 68 prevents the rollers 67 exiting the recesses 64. A wear reduction member, which is fluorocarbon resin coating 48 in this embodiment, is formed on the surface of each roller 67. In FIG. 3(b), the fluorocarbon resin coating 48 is exaggerated for purposes of illustration. The coating prevents the surface of the roller 67 from being worn due to contact with the surface of the recess 64 and the inner surface of the lid 68.

When the compressor C is operated by the engine E, each roller 67 contacts the corresponding guide surface 65 due to centrifugal force. If torque fluctuations occur in this state, each roller 67 reciprocates along the guide surface 65 in the corresponding recess 64. That is, each roller 67, or its center of gravity, moves in a manner that is comparable with the movement of the pendulum 46 of the embodiment illustrated in FIGS. 1 to 2(b). In other words, the rollers 67 function as centrifugal pendulum when the compressor C is operated by the engine E.

In this embodiment, the center of each imaginary circle, which includes one of the guide surfaces 65, is aligned with the axis of the swinging motion of the corresponding roller 67. That is, the distance $R_1$ between the rotation axis of the pulley body 61 and the center of each imaginary circle corresponds to the distance R in the embodiment illustrated in FIGS. 1 to 2(b).

The distance between the center of swinging motion of each roller 67 and the center of gravity of the roller 67 is equal to the difference between the radius $r_1$ of the imaginary circle and one-half the diameter $d_1$ of each roller 67. That is, the difference $(r_1-(d_1/2))$ corresponds to the distance r in the embodiment illustrated in FIGS. 1 to 2(b).

In this embodiment, the values $R_1$, $r_1$ and $d_1$ are determined such that the square root of the ratio $R_1/(r_1-d_1/2))$ is equal to the number N when the n is one for reducing the greatest peak of torque fluctuations.

A value that corresponds to the value m of the equation 1 is the total mass of the rollers 67, or $2m_1$.

In this embodiment, the total mass $2m_1$ of the rollers 67 is maximized so that the values $R_1$, $(r_1-(d_1/2))$ and $\phi$ are minimized. As a result, the torque T is maximized without increasing the size of the pulley body 42.

As in the embodiment illustrated in FIGS. 1 to 2(b), various settings are made in the assumption that each roller 67 is a mass point at the center of gravity.

In addition to the advantages (1) and (2) of the first embodiment, the second embodiment has the following advantages.

(5) The recesses 64 are formed in the pulley body 61 and each have the guide surface 65, which has an arcuate cross section. Each rigid roller 67, which has a circular cross section, moves along the corresponding guide surface 65. If a mass body is supported at a fulcrum by a support shaft, the distance between the center of swinging of the mass body, or the fulcrum, and the center of gravity of the mass body is varied due to the space created between the support shaft and a hole formed in the mass body for receiving the support shaft. However, in the second embodiment, the rollers 67 are not supported by fulcrums of swinging. The distance between the center of swinging, or fulcrum, and the center of gravity of the mass body is constant. Therefore, resonance is reliably reduced.

(6) In the pulley body 61, two rollers 67 swing. Compared to a case where a single roller swings, the total mass is greater in the second embodiment. That is, the value that corresponds to the value m in the equation 1 is increased. Therefore, the torque T is increased without increasing the size of the pulley body 61.

(7) The fluorocarbon resin coating 48 is formed on the surface of each roller 67 to reduce wear due to contact with the surface of the recess 64 and the lid 68. Since the coating 48 friction resistance between each roller 67 and the pulley body 61, wear at the contact portions is reduced. In other words, the rollers 67 and the pulley body 61 are scarcely deformed by wear. This improves the resonance reduction performance and extends the life of the pulley 60.

A pulley 60 according to a third embodiment of the present invention will now be described with reference FIGS. 4(*a*) and 4(*b*). Mainly, the differences from the pulley 17 illustrated in FIGS. 3(*a*) and 3(*b*) will be discussed below.

As shown in FIG. 4(*a*), guide portions, which are six recesses 80 in this embodiment, are formed in the pulley body 61. The recesses 80 are angularly spaced by constant intervals. Compared to the recesses 64 in the embodiment of FIGS. 3(*a*) and 3(*b*), each recess 80 is wide in the circumferential direction. Particularly, the circumferential size of each recess 80 is increased toward the center of the pulley body 61. In each recess 80, the circumferential dimension is not uniform.

A guide surface 82 is formed in the radially outer portion of each recess 80. Each guide surface 82 has an arcuate cross section. Each guide surface 82 is included in an imaginary circle. The center of the imaginary circle is spaced from the rotation axis of the pulley body 61 by a predetermined distance $R_2$ and the radius of the circle is represented by $r_2$.

A cylindrical rigid roller 83 is accommodated in each recess 80. The roller 83 has a circular cross section. The mass of each roller 83 is represented by $m_2$. The diameter of each roller 83 is represented by $d_2$. A wear reduction member, which is fluorocarbon resin coating 48 in this embodiment, is formed on the surface of each roller 83. In FIG. 4(*b*), the fluorocarbon resin coating 48 is exaggerated for purposes of illustration. The coating prevents the surface of the roller 83 from being worn due to contact with the surface of the recess 80 and the inner surface of the lid 68.

As in the rollers 67 of the embodiment illustrated in FIGS. 3(*a*) and 3(*b*), each roller 83 contacts the corresponding guide surface 82 due to centrifugal force when the compressor C is operated by the engine E. If torque fluctuations occur in this state, each roller 83 reciprocates along the guide surface 82 in the corresponding recess 80. That is, each roller 83 moves in a manner that is comparable with the movement of the pendulum 46 of the embodiment illustrated in FIGS. 1 to 2(*b*).

The values $R_2$, $r_2$, and $d_2$ correspond to the values $R_1$, $r_1$, and $d_1$ in the embodiment of FIGS. 3(*a*) and 3(*b*), respectively. The distances $R_2$, $r_2$ and $d_2$ are determined such that the square root of the ratio $R_2/(r_2-d_2/2)$ is equal to the number N when the n is one for reducing the greatest peak of torque fluctuations.

A value that corresponds to the value m of the equation (1) is the total mass of the rollers 83, or $6m_2$.

In this embodiment, the total mass $6m_2$ of the rollers 83 is maximized so that the values $R_2$, $(r_2-(d_2/2))$ and $\phi$ are minimized. As a result, the torque T is maximized without increasing the size of the pulley body 61.

As in the embodiments illustrated in FIGS. 1 to 3(*b*), various settings are made in the assumption that each roller 83 is a mass point at the center of gravity.

In addition to the advantages (1), (2), (5), (6), and (7) of the above illustrated embodiments, the third embodiment has the following advantages.

(8) Compared to the embodiment of FIGS. 3(*a*) and 3(*b*), the number of the mass bodies, or the rollers 83, is increased to six. The number of the recesses 80 is also six. Therefore, the torque T is increased without increasing the size of the pulley body 61.

(9) Compared to the embodiment of FIGS. 3(*a*) and 3(*b*), the circumferential dimension of each recess 80 increases toward the rotation axis of the pulley body 61. This structure permits the diameter and the mass of each roller 83 to be increased. Therefore, the torque T is further increased.

A fourth embodiment of the present invention will now be described with reference FIG. 5. Mainly, the differences from the embodiment of FIGS. 3(*a*) and 3(*b*) will be discussed below.

Figure 5:
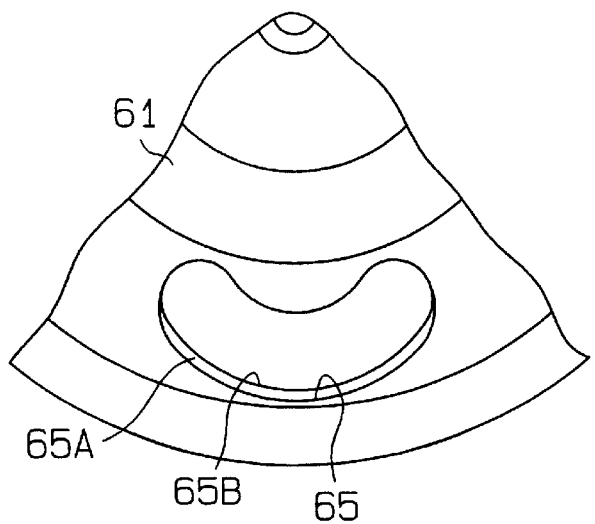
FIG. 5 is a partial front view illustrating a pulley body according to a fourth embodiment of the present invention.

FIG. 5 illustrates a pulley body 61 before being attached to the drive shaft 16. Also, in FIG. 5, the roller 67 and the lid 68 have not been installed in the pulley body 61. A sintered member 65A, which contains lubricant, is attached to the guide surface 65. The inner surface 65B of the sintered member 65A contacts the corresponding roller 67. The lubricant in the sintered member 65A reduces the friction resistance between the roller 67 and the surface 65B. Therefore, wear of the contact portions is reduced.

A fifth embodiment of the present invention will now be described with reference to FIGS. 6(*a*) and 6(*b*).

Figure 6A:
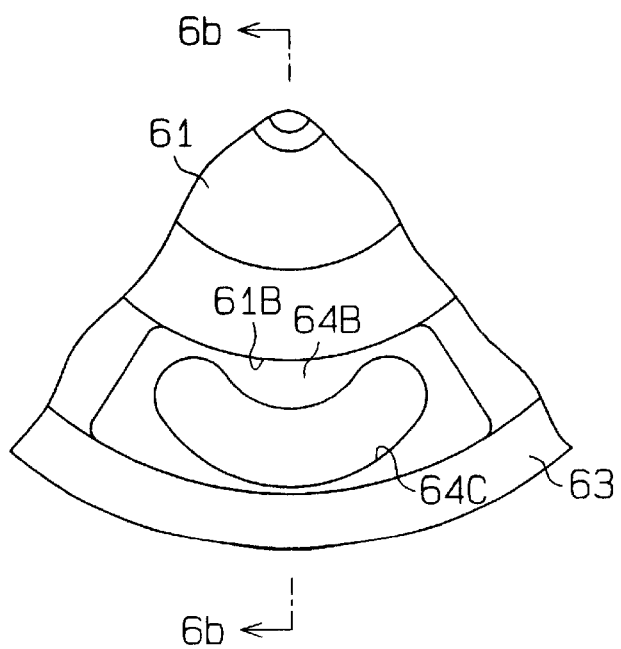
FIG. 6(a) is a partial front view illustrating a pulley body according to a fifth embodiment of the present invention.
Figure 6B:
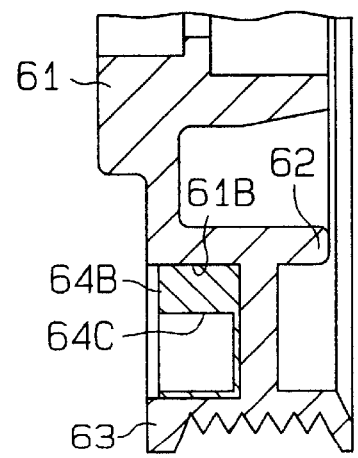
FIG. 6(b) is a cross-sectional view taken along line 6b—6b of FIG. 6(a)

FIGS. 6(*a*) and 6(*b*) illustrate a pulley body 61 before being attached to the drive shaft 16. Also, in FIGS. 6(*a*) and 6(*b*), the roller 67 and the lid 68 have not been installed in the pulley body 61. An accommodation recess 61B is formed in a portion of the pulley body 61 between the boss 62 and the belt receiving portion 63. The accommodation recess 61B accommodates a guide block 64B. The guide block 64B is a sintered member containing lubricant. A roller recess 64C is formed in the guide block 64B to receive the roller 67. The lubricant in the guide block 64B reduces the friction resistance between the roller 67 and the surface of the roller recess 64C. Therefore, wear of the contact portions is reduced.

Figure 7A:
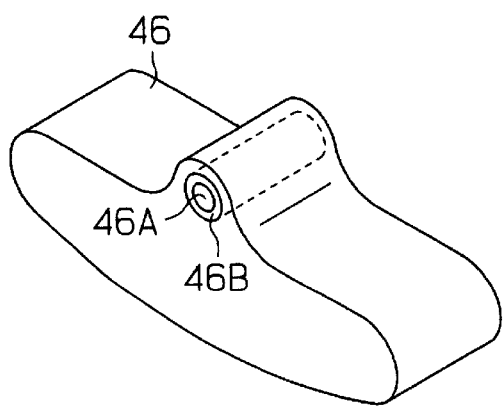
FIG. 7(a) is a perspective view illustrating a pendulum according to a sixth embodiment of the present invention.
Figure 7B:
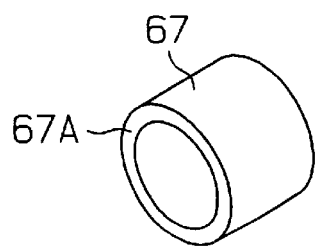
FIG. 7(b) is a perspective view illustrating a roller according to a seventh embodiment of the present invention.

A sixth embodiment according to the present invention will now be described with reference to FIG. 7(*a*). In this embodiment, the hole 46A of the rigid pendulum 46, to which the support shaft 47 is inserted, is formed in a sintered cylinder 46B containing lubricant. The lubricant in the cylinder 46B reduces the friction resistance between the support shaft 47 and the cylinder 46B. Therefore, wear of the contact portions is reduced.

A seventh embodiment according to the present invention will now be described with reference to FIG. 7(*b*). The differences from the embodiment of FIGS. 3(*a*) and 3(*b*) will be discussed. In the seventh embodiment, a sintered layer 67A containing lubricant is formed on the circumference of the roller 67, which contacts the guide surface 65. The lubricant in the layer 67A reduces wear between the guide surface 65 and the roller 67. In the embodiment of FIGS. 4(*a*) and 4(*b*), the surface of each roller 83 may be formed with a sintered material.

Figure 8:
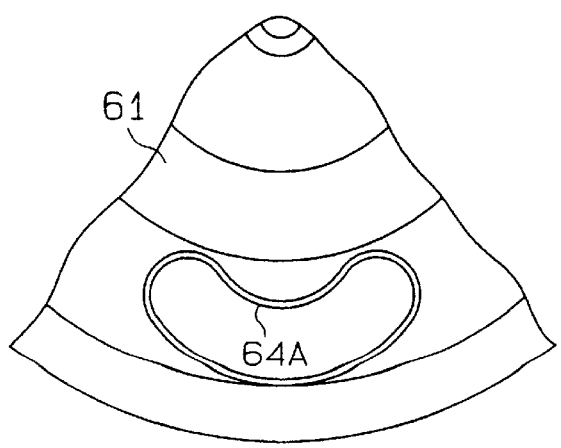
FIG. 8 is a partial front view illustrating a pulley body according to an eighth embodiment of the present invention.

An eighth embodiment according to the present invention will now be described with reference to FIG. 8. The differences from the embodiment of FIG. 3(a) will be discussed. FIG. 8 illustrates a pulley body 61 before being attached to the drive shaft 16. Also, in FIG. 8, the roller 67 and the lid 68 have not been installed in the pulley body 61. A wear reduction member, which is a metal collar 64A in this embodiment, is fitted to the recess 64 to form the guide surface 65 and the auxiliary guide surface 66. Except for the collar 64A, the pulley body 61 is made of resin. In this embodiment, a lid (not shown) is attached to the pulley body 61 to prevent the collar 64A from escaping. The lid may be made of metal or resin. Since the pulley body 61 is made of resin except for the metal collar 64A, the weight of the pulley body 61 is reduced compared to a case where the pulley body 61 is made of metal. Since the guide surface is formed of metal, the guide surface is less prone to wear. The guide surface 82 illustrated in FIGS. 4(a) and 4(b) may be formed of metal.

Figure 9:
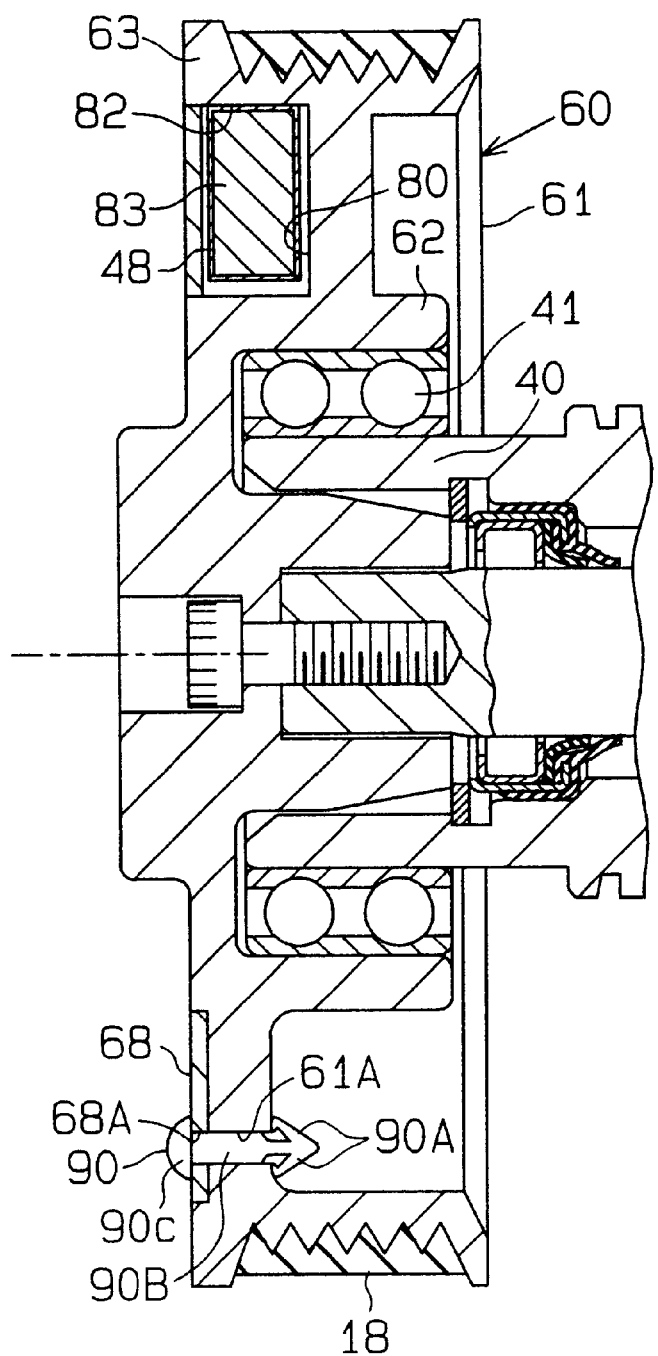
FIG. 9 is an cross-sectional view illustrating a pulley according to a ninth embodiment.

In the embodiments illustrated in FIGS. 3(a) to 4(b), the lid 68 is coupled to the pulley body 61 by bolts. However, the lid 68 may be attached to the pulley body 61 by means other than bolts. For example, crimping pins or press fitting pins may be used. Such pins are inserted into holes formed in the lid 68 and corresponding holes formed in the pulley body 61. An end of a crimping pin is crimped so that it does not escape the corresponding holes. A press fitting pin is press fitted into the corresponding holes. For example, in a ninth embodiment illustrated in FIG. 9, a pin 90 having an elastic portion 90A is used. FIG. 9 is a schematic cross-sectional view illustrating the pulley 60. A hole 68A is formed in the lid 68 and a hole 61A is formed in the pulley body 61 to correspond to the hole 68A. The diameter of the hole 61A is substantially the same as that of the hole 68A. The pin 90 extends through the holes 68A and 61A. The main portion 90B of the pin 90 is cylindrical and has substantially the same diameter as the diameter of the holes 61A, 68A. A head 90C, the diameter of which is greater than that of the hole 68A is formed integrally with the main portion 90B at one end. Engaging pieces 90A (only two of them are shown in FIG. 9) are formed integrally with the main portion 90B at the other end of the main portion 90B. In the normal state, each engaging piece 90A is tapered toward the distal end. In this state, the distal end of each engaging portion 90A is located radially outside of the opening of the hole 61A. Therefore, the engaging portions 90A and the head 90C prevent the pin 90 from escaping the holes 61A, 68A, and the lid 68 is secured to the pulley body 61. The engaging portions 90A can be elastically deformed by external force. When the engaging portions 90A are deformed, the proximal ends are radially inward of the holes 61A, 68A. That is, the pin 90 can be inserted into and removed from the holes 61A, 68A by deforming the engaging portions 90A. When securing the lid 68 to the pulley body 61 by using the pin 90, the pin 90 need not be rotated or crimped, which facilitates the installation.

The present invention may be embodied in the following forms.

In the embodiment of FIGS. 1 to 2(b), the pendulum 46 may include a support shaft and the support shaft may be inserted into the hole 46A formed in the pulley body 42.

In the embodiment of FIGS. 1 to 2(b), an additional rigid pendulum that is similar to the pendulum 46 may be used. In this case, the additional pendulum is located symmetrically from the rigid pendulum 46 with respect to the rotation axis of the pulley body 42. Alternatively, the number of the pendulum 46 may be increased to three or more. In this case, the pendulums 46 are angularly spaced at the constant intervals.

In some cases, the center of gravity of the pulley body 42 is displaced by the pendulum 46. In the embodiment of FIGS. 1 to 2(b), a balancer such as a counter weight may be located in the pulley body 42 to balance the center of gravity of the pulley body 42. Alternatively, a notch may be formed in the pulley body 42.

In the embodiments of FIGS. 3(a) to 4(b), the cross-sectional shape of each recess 64, 80 may be circular. In this case, the guide surface 65, 82 is formed as a part of the circular recess 64, 80. This structure facilitates the formation of the recess 64, 80.

In the embodiments of FIGS. 3(a) to 4(b), the rollers 67, 83 may be replaced by balls.

In the embodiments shown in FIGS. 1 to 9, the square root of the ratio R/r is set equal to nN in which n is one, or to N. However, the square root of the ratio R/r may be set equal to nN in which n is two or a greater natural number.

In the embodiments of FIGS. 1 to 9, the number of mass bodies (the pendulum 46, the roller 67, 83) may be two or more. The number of mass need not correlate the number of the cylinder bores 24 of the compressor C.

In the embodiments of FIGS. 1 to 9, one of the mass bodies (the pendulum 46, the roller 67, 83) may be configured such that the ratio R/r is different from those of the other mass bodies.

Two or more of the pendulum 46, the roller 67, 83 may be used in a single pulley.

In the embodiments of FIGS. 1 to 9, various settings are made on the assumption that the mass body is a mass point at the center of gravity. However, various settings are preferably made by considering the inertial mass of the mass body. For example, the ratio R/r is preferably replaced by a ratio 2R/3r in the embodiments shown in FIGS. 3(a) to 4(b) to take the inertial mass into consideration. In this case, the equation (1), which represents the torque T when the peak of torque fluctuations is equal to the characteristic frequency of the rollers, is replaced by the following equation (2).

$$T = (3/2)m(\omega^a)^2(R+r)R\phi \qquad \text{(Equation 2)}$$

When a ball is used as a mass body that swings along the guide surface (65, 82), the ratio R/r is replaced by a ratio 5R/7r for taking the inertial mass into consideration. In this case, the equation (1), which represents the torque T when the peak of the torque fluctuations is equal to the characteristic frequency of the mass body, is replaced by the following equation (3).

$$T = (7/5)m(\omega^a)^2(R+r)R\phi \qquad \text{(Equation 3)}$$

If a mass body the shape of which is not cylindrical or spherical is used, the inertial mass of the mass body is preferably considered in determining various settings for improving the resonance reduction performance.

The pulley 17, 60 may be used for a double-headed piston type compressor. In a double-headed piston type compressor, two compression chambers are defined in each cylinder bore at both ends of the corresponding piston.

The present invention may be applied to a compressor other than the compressor C. For example, the present invention may be applied for a wobble plate type compressor, in which a drive plate is rotatably supported by a drive shaft.

The present invention may be embodied in a fixed displacement type compressor.

The embodiments of FIGS. 1 to 9 may be applied to a scroll-type compressor.

The embodiments of FIGS. 1 to 9 may be applied to any type of rotation apparatus as long as the apparatus includes a rotary shaft and a pulley that rotate integrally, and torsional vibration is produced in the rotary shaft.

In the embodiments shown in FIGS. 1 to 9, the center of swinging motion of the mass body (the rigid pendulum 46, the roller 67, 83) need not be parallel to the rotation axis of the pulley body 42, 61. The axis of the swinging motion may be inclined relative to the rotation axis of the pulley body within a range where a predetermined torque fluctuation reduction performance is obtained. If the axis of the swinging motion is inclined with respect to the rotation axis of the pulley body, a distance Rs, which will be discussed later, is used as the distance between the center of the swinging motion and the rotation axis of the pulley body. The distance Rs represents the distance between a point at which the axis of the swinging motion intersects a plane that is perpendicular to the swinging motion axis and a point at which the plane intersects the rotation axis of the pulley body.

The embodiments shown in FIGS. 1 to 9 may be applied to a sprocket of a gear.

The mass body (the rigid pendulum 46, the roller 67, 83) may be attached to a rotating member accommodated in the housing of the compressor C such as the lug plate 19 or other member for reducing the rotational vibration produced in the drive shaft 16.

In the embodiments shown in FIGS. 1 to 4(b), the fluorocarbon resin forming the coating is preferably polytetrafluoroethylene. Compared to other fluorocarbon resin, polytetrafluoroethylene has better lubrication characteristics.

In the embodiment shown in FIGS. 1 to 2(b), a fluorocarbon resin coating may be formed at the contacting parts of the pendulum 46 and the head of the support shaft 47. Also, fluorocarbon resin coating may be formed at the contacting parts of the pendulum 46 and the pulley body 42.

In the embodiment of FIGS. 1 to 2(b), fluorocarbon resin coating may b formed on the support shaft 47.

In the embodiments shown in FIGS. 3(a) to 4(b), fluorocarbon resin coating may be formed only on a part of the roller (67, 83) that contacts the guide surface (65, 82). Alternatively, fluorocarbon resin coating may be formed only on a part of the recess (64, 80) that contacts the facing surface or the lid 68.

In the embodiments shown in FIGS. 3(a) to 4(b), fluorocarbon resin coating may be formed on a surface that is a part of the recess (64, 80) or on a part of the lid 68 that contacts the roller (67, 83).

In the embodiments shown in FIGS. 1 to 9, the wear reduction member is fluorocarbon resin coating. However, the wear reduction member is not limited to the fluorocarbon resin coating. Any material or method may be used as the wear reduction member as long as the means reduces wear caused by contact between the pulley body 42, 61 and the mass body (the pendulum 46, the roller 67, 83), prevents the resonance reduction performance of the swinging motion from deteriorating due to wear, and prevents the life of the pulley 17, 60 from being shortened. The coating may include a resin binder and a solid lubricant. Specifically, the solid lubricant contained in the coating may be, for example, molybdenum disulfide, tungsten disulfide, lead, indium, tin, graphite, boron nitride, antimony oxide, and lead oxide.

In the embodiments of FIGS. 1 to 9, as the wear reduction member, hard anodic oxide coating may be formed on the mass body (the pendulum 46 or the roller 67, 83) and the pulley body 42, 61. In this case, since the hard anodic oxide coating is formed on the contacting parts of the mass and the pulley body 42, 61, the surface of the mass body and the pulley body 42, 61 are hardened and wear resistance is improved.

In the embodiments of FIGS. 1 to 9, the surface of the mass body (the pendulum 46, the roller 67, 83) and the surface of the pulley body 42, 61 may be modified and hardened for forming the wear reduction member. In this case, the contacting parts of the mass body (the pendulum 46, the roller 67, 83) and the pulley 17, 60 are hardened and the wear resistance is improved.

In the embodiments of FIGS. 1 to 4(b), the entire pulley body 42, 61 may be made of sintered material containing lubricant. Further, only part of the pulley body 42, 61 that contacts the mass body (the pendulum 46, the roller 67, 83) may be made of sintered material. Also, in the embodiment shown in FIGS. 1 to 2(b), only the support shaft 47 may be made of sintered material.

In the embodiments of FIGS. 3(a) to 4(b), the lid 68 may be made of the sintered material. In the embodiments of FIGS. 1 to 4(d), the entire mass body (the pendulum 46, the roller 67, 83) may be made of the sintered material. Alternatively, only part of the mass body (the pendulum 46, the roller 67, 83) that contacts the pulley body 42, 61 may be made of the sintered material. Also, the entire surfaces of the mass body (the pendulum 46, the roller 67, 83) may be made of the sintered material.

The lubricant used in the illustrated embodiment may be liquid such as lubricant oil or solid. Solid lubricant is made of, for example, ethylene tetrafluoride, molybdenum disulfide, tungsten disulfide, lead, indium, tin, graphite, boron nitride, antimony oxide, and lead oxide. In this case, the lubricant contained in the sintered material reduces friction resistance between the pulley body and the mass body, and thus reduces wear.

Figure 4B:
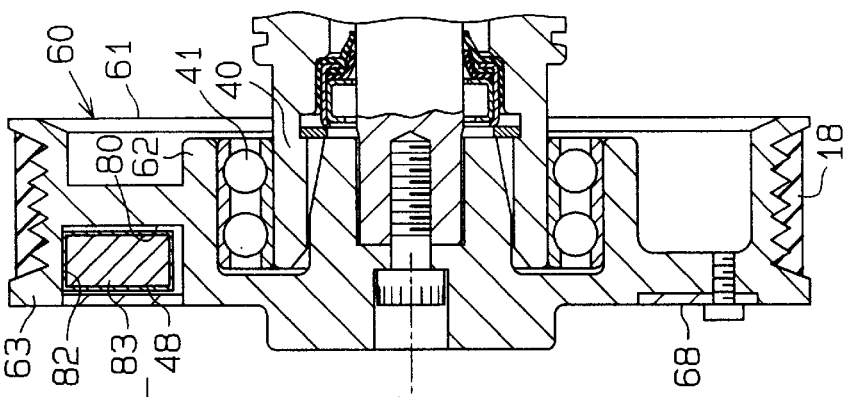
FIG. 4(b) is a cross-sectional view taken along line 4b—4b of FIG. 4(a)
Figure 4A:
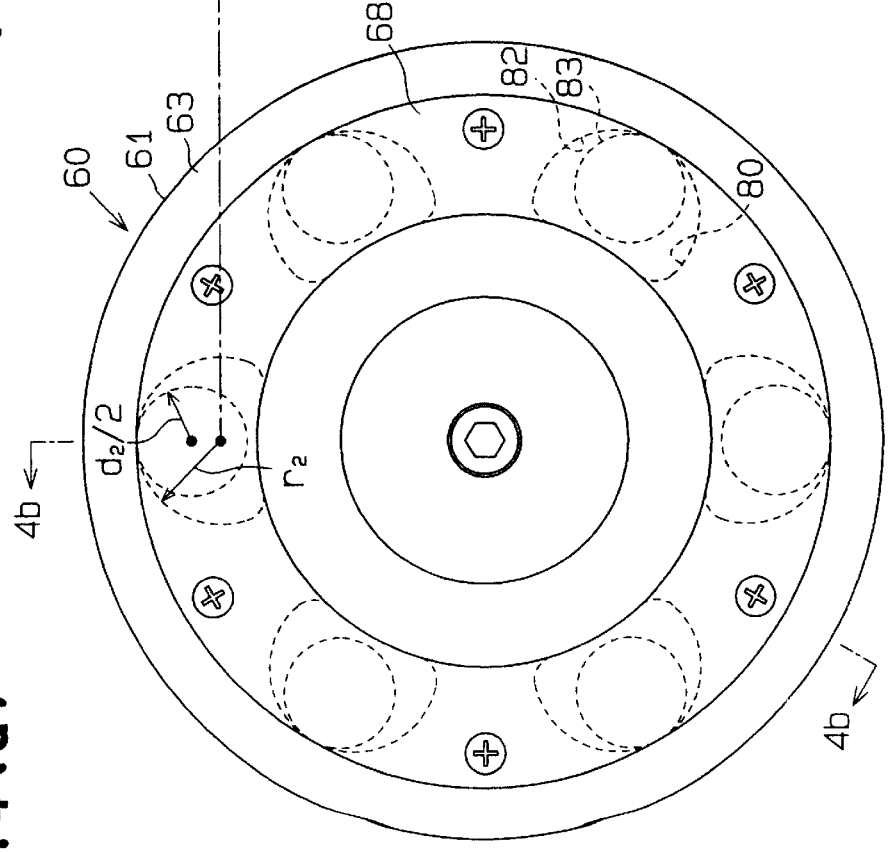
FIG. 4(a) is a front view illustrating a pulley according to a third embodiment of the present invention.

In the embodiment of FIGS. 4(a) to 4(b), an independent member made of sintered material containing lubricant may be used as a part of the pulley body 61, and the recess 80 may be formed in this member.

In the embodiments of FIGS. 1 to 9, liquid lubricant such as lubricant oil may be applied to the contacting parts of the pulley body 42, 61 and the mass body (the pendulum 46, the roller 67, 83). The liquid lubricant preferably has low viscosity. This is because the lower the viscosity of a lubricant is, by the smaller degree the lubricant hinders the swinging motion of the mass body (the pendulum 46, the roller 67, 83). In this structure, the liquid lubricant reduces the friction resistance between the pulley body 42, 61 and the mass body (the pendulum 46, the roller 67, 83), and thus reduces wear.

Therefore, the present examples and embodiments are to be considered as illustrative and not restrictive and the invention is not to be limited to the details given herein, but may be modified within the scope and equivalence of the appended claims.

What is claim is:

1. A compressor having a pulley for transmitting torque from an external drive source to a rotary shaft to drive a compression mechanism, wherein the pulley has a pulley body, the compressor comprising:

a mass body located in a range that is radially inward of the outer circumference of the pulley, wherein the mass body swings about an axis that is spaced from the rotation axis of the pulley body by a predetermined distance and is substantially parallel to the rotation axis of the pulley body.

2. The compressor according to claim 1, wherein the mass body is a rigid body that is rotatably supported by the pulley body.

3. The compressor according to claim 1, wherein the pulley body has a guide portion that guides the mass body, wherein the guide portion has a guide surface having an arcuate cross section, wherein the mass body is a rigid body that has a circular cross section, and wherein the mass body moves along the guide surface.

4. The compressor according to claim 3, wherein the guide portion has an inner surface having an arcuate cross section, and wherein the guide surface is a part of the inner surface.

5. The compressor according to claim 1, wherein the ratio of the distance between the axis of the rotary shaft and the axis of the swinging motion of the mass body to the distance between the axis of the swinging motion of the mass body and the center of gravity of the mass body is determined such that the frequency of the greatest peak of fluctuations in the torque transmitted to the pulley body is equal to the characteristic frequency of the mass body.

6. The compressor according to claim 1, wherein the mass body is one of a plurality of mass bodies, wherein one of the mass bodies is configured such that the ratio of the distance between the rotation axis of the pulley body and the axis of the swinging motion of the mass body and the distance between the axis of the swinging motion of the mass body and the center of gravity of the mass body is different from those of the other mass bodies.

7. The compressor according to claim 1, wherein the compression mechanism is a piston type compression mechanism for compressing fluid based on reciprocation of the piston, wherein the piston is accommodated in a cylinder bore.

8. The compressor according to claim 1, wherein at least one of the pulley body and the mass body includes a wear reduction member for reducing wear due to contact between the pulley body and the mass body.

9. The compressor according to claim 8, wherein part of the pulley body that contacts the mass body is formed with metal and the other part of the pulley body is formed with resin.

10. The compressor according to claim 8, wherein the wear reduction member is a coating, and wherein the coating is formed on one of the surface of the pulley body and the surface of the mass body.

11. The compressor according to claim 10, wherein the coating includes solid lubricant.

12. The compressor according to claim 8, wherein the wear reduction member is liquid lubricant.

13. The compressor according to claim 8, wherein the wear reduction member is a sintered member containing lubricant.

14. The compressor according to claim 8, wherein the wear reduction member is a resin containing lubricant.

15. A pulley for a compressor, comprising:
a pulley body;
a mass body located in a range that is radially inward of the outer circumference of the pulley, wherein the mass body swings about an axis that is spaced from the rotation axis of the pulley body by a predetermined distance and is substantially parallel to the rotation axis of the pulley body.

16. The pulley according to claim 15, wherein the mass body is a rigid body that is rotatably supported by the pulley body.

17. The pulley according to claim 15, wherein the pulley body has a guide portion that guides the mass body, wherein the guide portion has a guide surface having an arcuate cross section, wherein the mass body is a rigid body that has a circular cross section, and wherein the mass body moves along the guide surface.

18. The pulley according to claim 17, wherein the guide portion has an inner surface having an arcuate cross section, and wherein the guide surface is a part of the inner surface.

19. The pulley according to claim 15, wherein at least one of the pulley body and the mass body includes a wear reduction member for reducing wear due to contact between the pulley body and the mass body.

20. The pulley according to claim 15, wherein the ratio of the distance between the rotation axis of the pulley body and the axis of the swinging motion of the mass body to the distance between the axis of the swinging motion of the mass body and the center of gravity of the mass body is determined such that the frequency of the greatest peak of fluctuations in the torque transmitted to the pulley body is equal to the characteristic frequency of the mass body.

21. The pulley according to claim 15, wherein the mass body is one of a plurality of mass bodies, wherein one of the mass bodies is configured such that the ratio of the distance between the rotation axis of the pulley body and the axis of the swinging motion of the mass body and the distance between the axis of the swinging motion of the mass body and the center of gravity of the mass body is different from those of the other mass bodies.

* * * * *